United States Patent
Satomura (10) Patent No.: US 9,682,692 B2
(45) Date of Patent: Jun. 20, 2017

(54) CONTROL APPARATUS FOR VEHICLE

(71) Applicant: Fuji Jukogyo Kabushiki Kaisha, Tokyo (JP)

(72) Inventor: Satoshi Satomura, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 34 days.

(21) Appl. No.: 14/862,638

(22) Filed: Sep. 23, 2015

(65) Prior Publication Data

US 2016/0090078 A1 Mar. 31, 2016

(30) Foreign Application Priority Data

Sep. 30, 2014 (JP) .................. 2014-199687

(51) Int. Cl.
| | | |
|---|---|---|
| *B60W 10/06* | (2006.01) | |
| *B60W 10/08* | (2006.01) | |
| *B60K 6/48* | (2007.10) | |
| *B60W 20/50* | (2016.01) | |
| *B60W 10/02* | (2006.01) | |

(Continued)

(52) U.S. Cl.
CPC ............... *B60W 10/06* (2013.01); *B60K 6/36* (2013.01); *B60K 6/48* (2013.01); *B60W 10/02* (2013.01); *B60W 10/08* (2013.01); *B60W 10/101* (2013.01); *B60W 20/00* (2013.01); *B60W 20/50* (2013.01); *B60K 2006/4825* (2013.01); *B60W 2030/203* (2013.01); *B60W 2540/06* (2013.01); *Y02T 10/6221* (2013.01); *Y02T 10/6286* (2013.01); *Y02T 10/7077* (2013.01); *Y10S 903/946* (2013.01)

(58) Field of Classification Search
None
See application file for complete search history.

(56) References Cited

U.S. PATENT DOCUMENTS

2012/0283901 A1  11/2012  Nagura et al.

FOREIGN PATENT DOCUMENTS

| JP | 2000-110603 A | 4/2000 |
|---|---|---|
| JP | 2007-076460 A | 3/2007 |

(Continued)

OTHER PUBLICATIONS

Decision of Grant dated May 12, 2016, issued in corresponding Japanese Patent Application No. 2014-199687.

(Continued)

*Primary Examiner* — Erin D Bishop
(74) *Attorney, Agent, or Firm* — Troutman Sanders LLP (57) ABSTRACT

A control apparatus for a vehicle that includes a first power transmission path, a second power transmission path, a clutch mechanism, a clutch controller, a supply current controller, a self-shut unit, and an electric power generating mode controller. The self-shut unit holds a conducting state of a second electric power supply line over a set time, in response to a change in a state of a first electric power supply line from a conducting state to a non-conducting state. The electric power generating mode controller executes an electric power generating mode that drives an electric motor to generate electric power upon a stop of a vehicle in which the clutch mechanism is disengaged. The supply current controller increases a supply current supplied to the clutch controller, in response to the change in the state of the first electric power supply line during the electric power generating mode.

16 Claims, 7 Drawing Sheets

(51) Int. Cl.
*B60K 6/36* (2007.10)
*B60W 10/101* (2012.01)
*B60W 20/00* (2016.01)
*B60W 30/20* (2006.01)

(56) References Cited

FOREIGN PATENT DOCUMENTS

| | | |
|---|---|---|
| JP | 2009-061808 A | 3/2009 |
| JP | 2009-210106 A | 9/2009 |
| JP | 2009-210110 A | 9/2009 |
| JP | 2012-091579 A | 5/2012 |
| JP | 2012-153311 A | 8/2012 |
| JP | 2012-183951 A | 9/2012 |
| JP | 2012-218494 A | 11/2012 |

OTHER PUBLICATIONS

Notification of Reasons for Refusal dated Jan. 14, 2016, issued in corresponding Japanese Patent Application No. JP2014-199687.

CONTROL APPARATUS FOR VEHICLE

CROSS-REFERENCE TO RELATED APPLICATIONS

The present application claims priority from Japanese Patent Application No. 2014-199687 filed on Sep. 30, 2014, the entire contents of which are hereby incorporated by reference.

BACKGROUND

The technology relates to a control apparatus for a vehicle that includes an engine and an electric motor.

A hybrid vehicle has been developed that has an engine and an electric motor as drive sources. The hybrid vehicle has operation modes, one of which is an electric power generating mode that drives the electric motor by means of engine power to generate electric power upon a stop of a vehicle, as disclosed in Japanese Unexamined Patent Application Publication (JP-A) No. 2012-153311. In order to suppress vibration and sound noise generated upon stopping an engine, JP-A No. 2012-153311 also discloses that a control of stopping the engine is executed after the number of revolutions of the engine is lowered down to the number of idling revolutions, when an ignition switch is turned off during the electric power generating mode in the disclosed hybrid vehicle. This allows a torque of a regenerating motor output for stopping the engine to be suppressed, and suppresses the vibration and the sound noise generated upon stopping the engine accordingly.

SUMMARY

Upon executing the electric power generating mode, a clutch inserted in a power transmission path is controlled to be disengaged to prevent the engine power and motor power from reaching drive wheels. For purpose of ensuring the minimum traveling capacity even when a supply of electric power to a solenoid valve, etc., is lost, the clutch inserted in the power transmission path is subjected to engagement when the supply of electric power is lost, i.e., is a clutch of a normally-engaged type.

For example, when the ignition switch is turned off during the execution of the foregoing electric power generating mode in a vehicle provided with the normally-engaged clutch, the clutch in the power transmission path is engaged in response to cutoff of electric power conduction. Such engagement of the clutch during the execution of the electric power generating mode results in connection of the rotating engine, etc, and the stopped drive wheels together, generating a large shock upon the engagement. The generation of large engagement shock can be a cause of a decrease in quality of a vehicle, and it is therefore desirable that the engagement shock of the clutch be suppressed.

It is desirable to suppress a shock generated upon engagement of a clutch during an electric power generating mode.

An aspect of the technology provides a control apparatus for a vehicle that includes: a first power transmission path that connects an engine and an electric motor together through the first power transmission path; a second power transmission path that connects the first power transmission path and at least one drive wheel together through the second power transmission path; a clutch mechanism inserted in the second power transmission path, and switched over between an engaged state and a disengaged state; a clutch controller that controls the clutch mechanism to be in the engaged state in response to a decrease in a supply current, and controls the clutch mechanism to be in the disengaged state in response to an increase in the supply current; a supply current controller coupled to the clutch controller through a conduction line and to an electric power supply through a first electric power supply line and a second electric power supply line in a parallel fashion, and that controls the supply current supplied to the clutch controller; a self-shut unit that holds a conducting state of the second electric power supply line over a set time, in response to a change in a state of the first electric power supply line from a conducting state to a non-conducting state; and an electric power generating mode controller that executes an electric power generating mode upon a stop of the vehicle, in which the electric power generating mode drives the electric motor to generate electric power upon the stop of the vehicle, and the stop of the vehicle causes the clutch mechanism to be disengaged. The supply current controller increases the supply current supplied to the clutch controller, in response to the change in the state of the first electric power supply line from the conducting state to the non-conducting state during the execution of the electric power generating mode.

DETAILED DESCRIPTION

Figure 1:
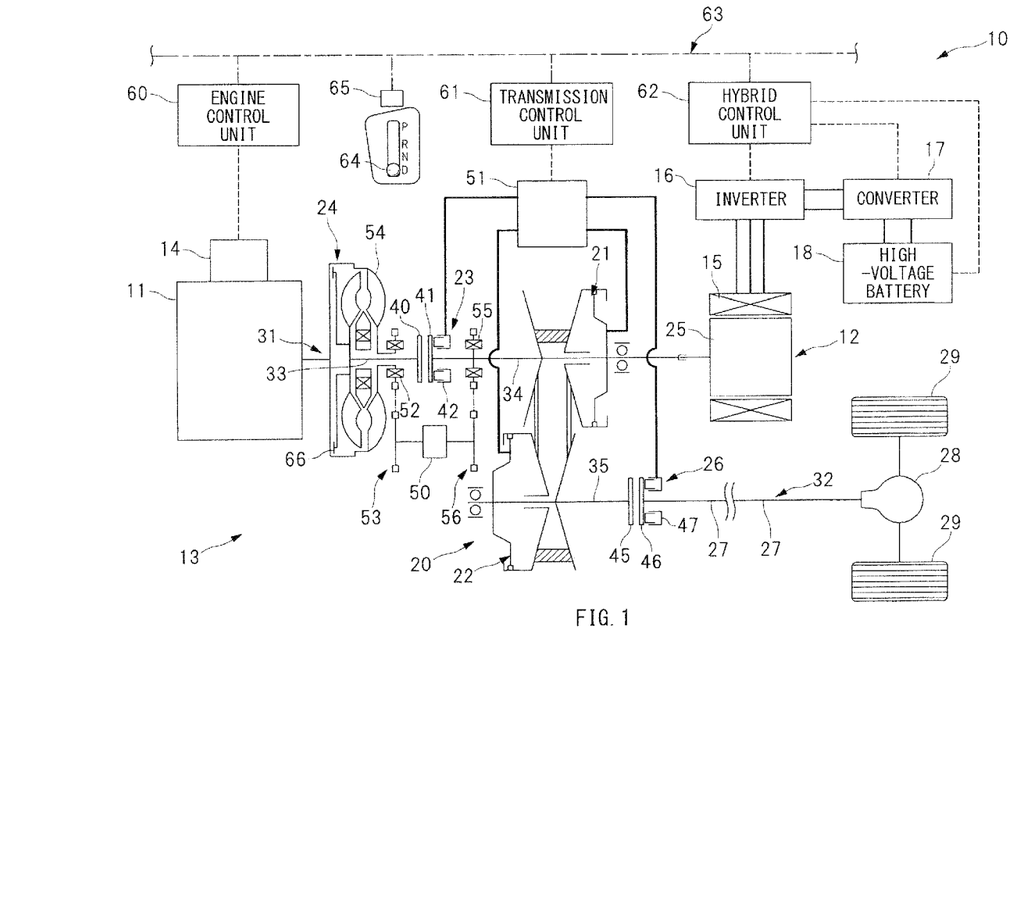
FIG. 1 illustrates a control apparatus for a vehicle according to an implementation of the technology.

In the following, some implementations of the technology are described in detail with reference to the drawings. FIG. 1 illustrates a control apparatus for a vehicle (hereinafter referred to as "control apparatus") 10 according to an implementation of the technology. Referring to FIG. 1, the control apparatus 10 includes a power unit 13 having an engine 11 and a motor generator (i.e., an electric motor) 12. The engine 11 provided in the power unit 13 may have an auxiliary machine 14 such as, but not limited to, a throttle valve and an injector. The motor generator 12 may include a stator 15 that may be coupled to a high-voltage battery 18 through an inverter 16 and a converter 17.

The power unit 13 may include a continuously-variable transmission 20 having a primary pulley 21 and a secondary pulley 22. The primary pulley 21 may have a first side part coupled to the engine 11 through an input clutch 23 and a torque converter 24, and a second side part coupled to a rotor 25 of the motor generator 12. The secondary pulley 22 may also be coupled to drive wheels 29 through an output clutch 26, a drive wheel output shaft 27, and a differential mechanism 28. The engine 11 and the motor generator 12 are thus coupled to each other through a "first power transmission path" 31 that may include, for example but not limited to, the torque converter 24, the input clutch 23, the primary pulley 21, etc. Also, the first power transmission path 31 and the drive wheels 29 are coupled to each other through a "second power transmission path" 32 that may include, for example but not limited to, the secondary pulley 22, the output clutch 26, the drive wheel output shaft 27, the differential mechanism 28, etc.

The input clutch 23 may be provided between the torque converter 24 and the primary pulley 21, and may be switchable between an engaged state and a disengaged state. The input clutch 23 may include a friction plate 40 coupled to a turbine shaft 33 of the torque converter 24, a friction plate 41 coupled to a primary shaft 34 of the primary pulley 21, and a hydraulic actuator 42 to which operating oil is fed. An increase in hydraulic pressure in the hydraulic actuator 42 causes the friction plates 40 and 41 to be engaged with each other, whereas a decrease in hydraulic pressure in the hydraulic actuator 42 releases the engagement of the friction plates 40 and 41. In other words, feeding the operating oil to the input clutch 23 causes the input clutch 23 to be in the engaged state, whereas discharging the operating oil from the input clutch 23 causes the input clutch 23 to be in the disengaged state. The input clutch 23 may be a single disc clutch, or may be a multiple disc clutch.

The output clutch 26 may be provided between the secondary pulley 22 and the drive wheel output shaft 27, and is switchable between an engaged state and a disengaged state. In one implementation, the output clutch 26 may serve as a "clutch mechanism". The output clutch 26 may include a friction plate 45 coupled to a secondary shaft 35 of the secondary pulley 22, a friction plate 46 coupled to the drive wheel output shaft 27, and a hydraulic actuator 47 to which the operating oil is fed. An increase in hydraulic pressure in the hydraulic actuator 47 causes the friction plates 45 and 46 to be engaged with each other, whereas a decrease in hydraulic pressure in the hydraulic actuator 47 releases the engagement of the friction plates 45 and 46. In other words, feeding the operating oil to the output clutch 26 causes the output clutch 26 to be in the engaged state, whereas discharging the operating oil from the output clutch 26 causes the output clutch 26 to be in the disengaged state. The output clutch 26 may be a single disc clutch, or may be a multiple disc clutch.

The power unit 13 may include an oil pump 50 driven by the engine 11 and the primary shaft 34 and adapted to feed the operating oil to the input clutch 23, the output clutch 26, the continuously-variable transmission 20, the torque converter 24, etc. Also, the power unit 13 may include a valve body 51 having a plurality of solenoid valves and oil passages and adapted to control feeding destination and pressure of the operating oil. The operating oil discharged from the oil pump 50 is fed via the valve body 51 to the input clutch 23, the output clutch 26, etc.

The oil pump 50 may be coupled to a pump shell 54 of the torque converter 24 through a chain mechanism 53. The chain mechanism 53 may include a unidirectional clutch 52. Also, the oil pump 50 may be coupled to the primary shaft 34 through a chain mechanism 56. The chain mechanism 56 may include a unidirectional clutch 55. This configuration allows drive force to be transmitted from the pump shell 54 to the oil pump 50 through the chain mechanism 53 when a rotation speed of the pump shell 54 is equal to or higher than a rotation speed of the primary shaft 34. In other words, the oil pump 50 is driven by means of engine power when the engine 11 is driven. The configuration allows drive force to be transmitted from the primary shaft 34 to the oil pump 50 through the chain mechanism 56 when the rotation speed of the pump shell 54 is lower than the rotation speed of the primary shaft 34. In other words, the oil pump 50 is driven, even when the engine 11 is stopped during, for example, a motor traveling mode to be described later, by the primary shaft 34 upon forward traveling. Note that the power unit 13 may include an unillustrated electric oil pump, for purpose of ensuring hydraulic pressure for a control even upon low-speed traveling and reverse traveling that involve a stop of the engine 11.

The control apparatus 10 may include a plurality of control units 60 to 62 adapted to control a working state of the power unit 13. There may be provided, as the control units, an engine control unit 60, a transmission control unit 61, and a hybrid control unit 62. The engine control unit 60 may control the engine 11. The transmission control unit 61 may control the continuously-variable transmission 20, the input clutch 23, the output clutch 26, etc. The hybrid control unit 62 may control the motor generator 12. The engine control unit 60 may output a control signal to the auxiliary machine 14 to control an operating state of the engine 11. The auxiliary machine 14 may be, for example but not limited to, the throttle valve and the injector. The transmission control unit 61 may output a control signal to the valve body 51 to control working states of the continuously-variable transmission 20, the input clutch 23, the output clutch 26, etc. The hybrid control unit 62 may output a control signal to the inverter 16 and the converter 17 to control a working state of the motor generator 12. The hybrid control unit 62 may receive a signal on a charge state SOC from the high-voltage battery 18.

The control units 60 to 62 each may include a microcomputer, a drive circuit, etc. The microcomputer may have CPU, ROM, RAM, etc., and the drive circuit may generate a control current to be supplied to each of various actuators. These control units 60 to 62 may be coupled to one another through an on-vehicle network 63 such as, but not limited to, CAN. The on-vehicle network 63 may be coupled to an inhibiter switch 65 that detects a position of a select lever 64 operated by an occupant. The on-vehicle network 63 may also be coupled to an accelerator sensor, a brake sensor, a vehicle speed sensor, etc., which are unillustrated. The accelerator sensor may detect an operation state of an accelerator pedal. The brake sensor may detect an operation state of a brake pedal. The vehicle speed sensor may detect a vehicle speed. Thus, various parameters indicating a traveling state of a vehicle may be transmitted on the on-vehicle network 63.

Figure 2A:
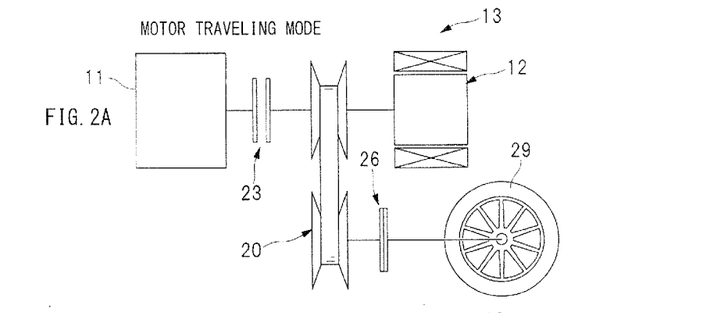
FIG. 2A to FIG. 2C schematically illustrate various operation modes of a power unit.
Figure 2B:
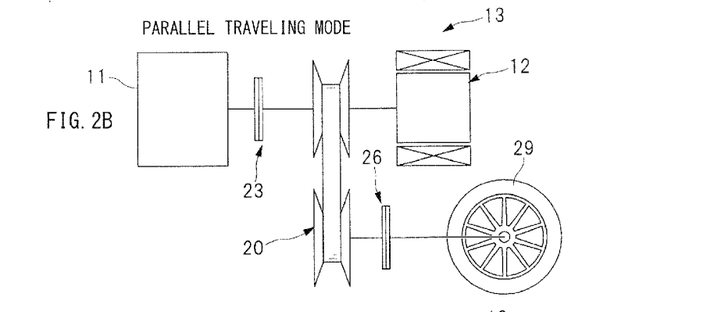
Figure 2C:
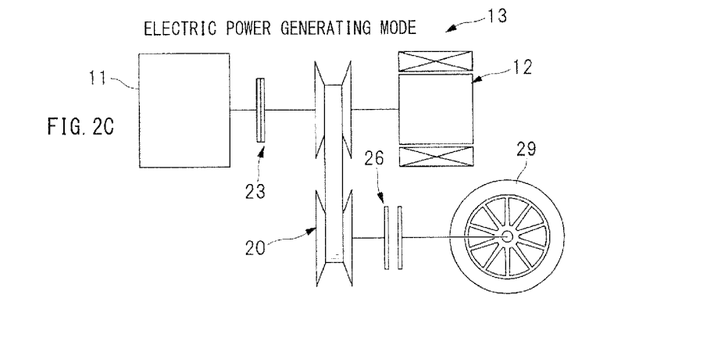

FIG. 2A to FIG. 2C schematically illustrate various operation modes of the power unit 13. Referring to FIGS. 2A to 2C, the power unit 13 may have the motor traveling mode, a parallel traveling mode, and an electric power generating mode as the operation modes. Upon setting the motor traveling mode, the input clutch 23 is disengaged and the output clutch 26 is engaged as illustrated in FIG. 2A. In the motor traveling mode, the engine 11 is stopped and only the power derived from the motor generator 12 is transmitted to the drive wheels 29. Upon setting the parallel traveling mode, both the input clutch 23 and the output clutch 26 are engaged as illustrated in FIG. 2B. In the parallel traveling mode, the power derived from the motor generator 12 and the power derived from the engine 11 are transmitted to the drive wheels 29. The motor generator 12 may be put into an idle state to allow only the engine power to be transmitted to the drive wheels 29 in the parallel traveling mode.

Upon setting the electric power generating mode, the input clutch 23 is engaged and the output clutch 26 is disengaged as illustrated in FIG. 2C. The term "electric power generating mode" refers to an operation mode in which the motor generator 12 is driven by the engine 11 to generate electric power, on conditions that the select lever 64 may be in a drive (D) range, the signal on the charge state SOC may indicate that a charge of the high-voltage battery 18 falls below a lower limit, and the vehicle is stopped. In the electric power generating mode, the output clutch 26 is controlled to be in the disengaged state to prevent rotation of each of the engine 11 and the motor generator 12 from being transmitted to the drive wheels 29. A lock-up clutch 66 of the torque converter 24 may be engaged in the electric power generating mode to efficiently transmit the engine power to the motor generator 12. Also, in the electric power generating mode, the number of revolutions of the engine 11 may be increased to increase efficiency of generating the electric power by the motor generator 12, within a range in which the increase in the number of revolutions does not bring about a sense of discomfort to an occupant. To execute the electric power generating mode, the engine control unit 60, the transmission control unit 61, and the hybrid control unit 62 may serve as an "electric power generating mode controller" in one implementation of the technology.

Figure 3:
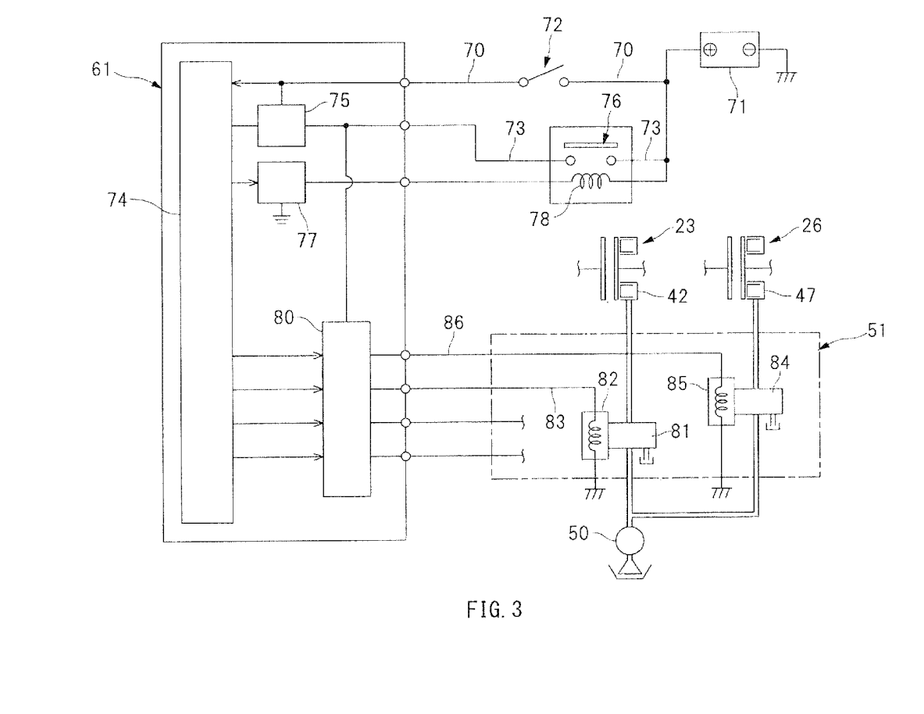
FIG. 3 schematically illustrates a part of a transmission control unit and a part of a valve body controlled by the transmission control unit.

A description is given next of configurations of the transmission control unit 61 and the valve body 51 controlled by the transmission control unit 61. FIG. 3 schematically illustrates a part of the transmission control unit 61 and a part of the valve body 51 controlled by the transmission control unit 61. Referring to FIG. 3, the transmission control unit 61 may be coupled to a low-voltage battery 71 through an ignition electric power supply line 70. The transmission control unit 61, the ignition electric power supply line 70, and the low-voltage battery 71 may respectively serve as a "supply current controller", a "first electric power supply line", and an "electric power supply" in one implementation of the technology. The ignition electric power supply line 70 may be provided with an ignition switch 72 turned on and off by an occupant. The transmission control unit 61 is also coupled to the low-voltage battery 71 through a main electric power supply line 73. The main electric power supply line 73 may serve as a "second electric power supply line" in one implementation of the technology. The transmission control unit 61 is thus coupled to the low-voltage battery 71 through the ignition electric power supply line 70 and the main electric power supply line 73, in which the ignition electric power supply line 70 and the main electric power supply line 73 are connected in parallel to each other between the transmission control unit 61 and the low-voltage battery 71.

The transmission control unit 61 may include an electric power supply circuit 75 that generates a voltage to be supplied to a microcomputer 74. The ignition electric power supply line 70 and the main electric power supply line 73 may be coupled to the microcomputer 74 through the electric power supply circuit 75. The transmission control unit 61 also includes a self-shut circuit 77 that controls a self-shut relay 76 inserted in the main electric power supply line 73. The self-shut circuit 77 may control a state of conduction of a solenoid 78 provided in the self-shut relay 76, based on a control current derived from the microcomputer 74. Controlling the solenoid 78 to be in a conducting state establishes connection with the self-shut relay 76 of the main electric power supply line 73. Controlling the solenoid 78 to be in a non-conducting state establishes disconnection from the self-shut relay 76 of the main electric power supply line 73.

The microcomputer 74 connects the self-shut relay 76 to control the main electric power supply line 73 to be in a conducting state, when the ignition switch 72 is turned on and thus the ignition electric power supply line 70 is placed into a conducting state. When the ignition switch 72 is turned off and thus the ignition electric power supply line 70 is placed into a non-conducting state, the microcomputer 74 continues the connection of the self-shut relay 76 over a predetermined set time, and disconnects the self-shut relay 76 thereafter. In other words, turning off the ignition switch 72 does not cause the main electric power supply line 73 to be disconnected immediately, but allows the microcomputer 74 to continue its operation over a predetermined time. The time for the microcomputer 74 to operate is ensured in this way, allowing the microcomputer 74 to execute various processes after the ignition switch 72 is turned off. The various processes here may be, such as but not limited to, storing learning values, etc., used for various controls into a backup memory. The self-shut relay 76 and the transmission control unit 61 may serve as a "self-shut unit" in one implementation of the technology.

A description is given next of the valve body 51 controlled by the transmission control unit 61. The transmission control unit 61 may include a drive circuit 80 that generates a control current. The valve body 51 is coupled to the drive circuit 80 through a plurality of conduction lines. The valve body 51 may have a plurality of built-in solenoid valves that control hydraulic pressure applied to each of the input clutch 23, the output clutch 26, the continuously-variable transmission 20, the torque converter 24, etc. The microcomputer 74 executes, in accordance with a control program, processing that is based on various parameters that indicate a traveling state, and outputs a control signal to the drive circuit 80. The drive circuit 80 receives the control signal from the microcomputer 74, and generates the control current to each of the various solenoid valves to control the working state of each of the input clutch 23, the output clutch 26, the continuously-variable transmission 20, the torque converter 24, etc.

An input clutch pressure control valve 81 may be provided as one of the solenoid valves. The input clutch pressure control valve 81 may adjust pressure of the operating oil fed to the input clutch 23, and include a solenoid 82. The drive circuit 80 of the transmission control unit 61 may be coupled to the solenoid 82 through a conduction line 83. The input clutch pressure control valve 81 serves as a so-called normally-open linear solenoid valve in which decreasing the control current supplied to the solenoid 82 increases the pressure of the operating oil fed to the input clutch 23, causing the input clutch 23 to be placed into the engaged state, whereas increasing the control current supplied to the solenoid 82 decreases the pressure of the operating oil fed to the input clutch 23, causing the input clutch 23 to be placed into the disengaged state. The control current to be supplied to the solenoid 82 may be adjusted in a range from a maximum value to a minimum value to freely adjust the pressure of the operating oil fed to the input clutch 23, making it possible to freely adjust engaging force, i.e., torque capacity, of the input clutch 23.

Also, an output clutch pressure control valve 84 is provided as one of the solenoid valves. The output clutch pressure control valve 84 adjusts pressure of the operating oil fed to the output clutch 26, and includes a solenoid 85. The output clutch pressure control valve 84 may serve as a "clutch controller" or a "solenoid valve" in one implementation of the technology. The drive circuit 80 of the transmission control unit 61 may be coupled to the solenoid 85 through a conduction line 86. The output clutch pressure control valve 84 serves as a so-called normally-open linear solenoid valve in which decreasing the control current (a "supply current" in one implementation of the technology)

supplied to the solenoid 85 increases the pressure of the operating oil fed to the output clutch 26, causing the output clutch 26 to be placed into the engaged state, whereas increasing the control current supplied to the solenoid 85 decreases the pressure of the operating oil fed to the output clutch 26, causing the output clutch 26 to be placed into the disengaged state. The control current to be supplied to the solenoid 85 may be adjusted in a range from a maximum value to a minimum value to freely adjust the pressure of the operating oil fed to the output clutch 26, making it possible to freely adjust engaging force, i.e., torque capacity, of the output clutch 26.

In the following, a description is given of a fail-safe control in the electric power generating mode. As already described with reference to FIG. 2C, the input clutch 23 is engaged in the electric power generating mode to connect the engine 11 and the motor generator 12 together, whereas the output clutch 26 is disengaged to maintain the stop of the drive wheels 29. Also, the output clutch pressure control valve 84 that adjusts the pressure of the operating oil fed to the output clutch 26 is the normally-open linear solenoid valve as described above. Hence, the output clutch 26 is of a normally-engaged type or a "normally-closed type", i.e., is a clutch subjected to engagement when the control current for the output clutch pressure control valve 84 is cut.

For example, when the ignition switch 72 is turned off during the electric power generating mode in which the output clutch 26 is disengaged, the control current for the output clutch pressure control valve 84 is cut, causing the output clutch 26 to be switched over suddenly from the disengaged state to the engaged state. The electric power generating mode is the operation mode in which the engine 11, the motor generator 12, the torque converter 24, the continuously-variable transmission 20, etc., are rotated. Under such a circumstance, when the output clutch 26 is subjected to sudden engagement in response to the turning off operation of the ignition switch 72, the rotating engine 11, etc, and the stopped drive wheels 29 are engaged suddenly. This may result in generation of a large engagement shock in the power unit 13. To address this, the control apparatus 10 according to the implementation executes the fail-safe control to avoid the sudden engagement of the output clutch 26, when the ignition switch 72 is turned off during the execution of the electric power generating mode.

Figure 4:
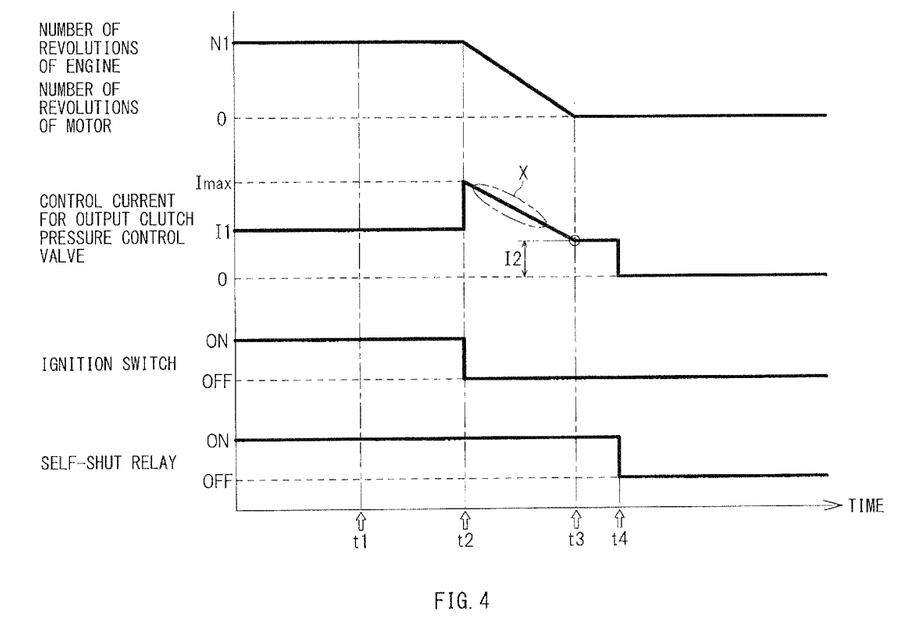
FIG. 4 is a time chart illustrating states of execution of a fail-safe control.
Figure 5A:
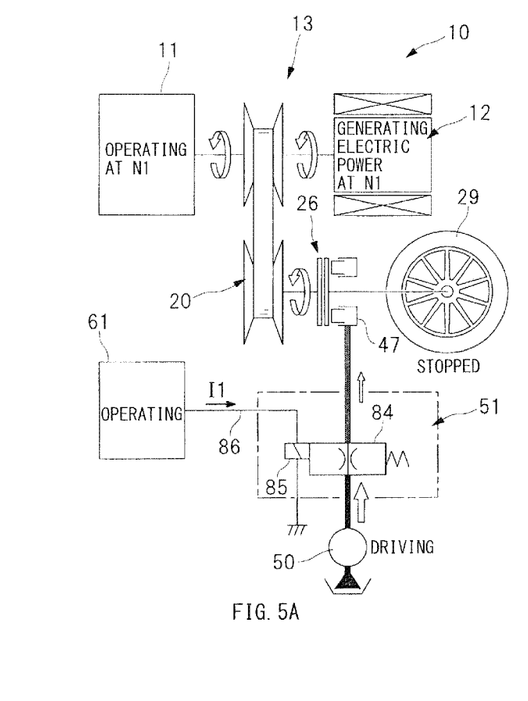
FIG. 5A and FIG. 5B each describe a state of the execution of the fail-safe control.
Figure 5B:
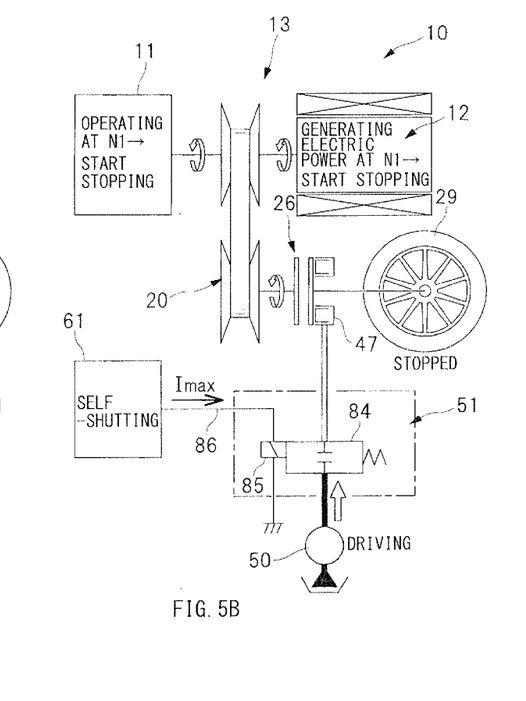

FIG. 4 is a time chart illustrating states of execution of the fail-safe control. FIGS. 5A, 5B, 6A, and 6B each describe a state of the execution of the fail-safe control. Referring to FIGS. 4 and 5A, the engine 11 and the motor generator 12 are controlled to rotate and the output clutch 26 is controlled to be in the disengaged state, at time t1 illustrated in FIG. 4, in the electric power generating mode. The number of revolutions of the engine 11 and that of the motor generator 12 are each controlled to be equal to the target number of revolution N1 adapted to the electric power generating mode. Also, the control current for the output clutch pressure control valve 84 is controlled at a target value I1 adapted to the electric power generating mode. The target value I1 is a current value set in the range from the minimum value to the maximum value of the control current, and causes the output clutch 26 to be held in a state that is the disengaged state immediately prior to starting of the engagement. Note that the electric power generating mode is the mode in which electric power may be generated in the D range where restart of the vehicle is likely, and thus the control current is set to the target value I1, not to the minimum value such as, but not limited to, 0 A (zero ampere), in order to improve responsiveness upon the restart during which the output clutch 26 is engaged.

Then, at time t2 illustrated in FIG. 4, the turning off of the ignition switch 72 during the execution of the electric power generating mode increases the control current for the output clutch pressure control valve 84 from the target value I1 to the maximum value Imax. This cuts the feeding of the operating oil to the output clutch 26 and causes the output clutch 26 to be switched over to the complete disengaged state, making it possible to suppress or avoid the generation of the engagement shock of the output clutch 26 resulting from the turning off of the ignition switch 72. Also, the electric power is supplied to the transmission control unit 61 through the self-shut relay 76 even when the ignition switch 72 is turned off as described above, making it possible for the transmission control unit 61 to increase the control current for the output clutch pressure control valve 84 up to the maximum value Imax. Note that the turning off of the ignition switch 72 initiates a stopping control of the engine 11 and the motor generator 12, and hence the number of revolutions of the engine 11 and that of the motor generator 12 decrease gradually.

After the control current for the output clutch pressure control valve 84 is increased to the maximum value Imax, the control current of the output clutch pressure control valve 84 is decreased down gradually as denoted by a reference sign X in FIG. 4. A decreasing speed at which the control current is decreased from the maximum value Imax may be set to be slower than an increasing speed at which the control current is increased to the maximum value Imax. The increasing speed and the decreasing speed may respectively serve as a "first speed" and a "second speed" in one implementation of the technology. Gradually decreasing the control current for the output clutch pressure control valve 84 in this way makes it possible to be prepared for turning on of the ignition switch 72 while avoiding the engagement shock of the output clutch 26.

In this connection, to avoid the engagement shock of the output clutch 26, a method may be contemplated in which the control current for the output clutch pressure control valve 84 is held at the maximum value Imax. It is, however, necessary to decrease the control current of the output clutch pressure control valve 84 gradually from the maximum value Imax to switch a state of the output clutch 26 from the complete disengaged state to the engaged state, when the ignition switch 72 is turned on again and the restart of the vehicle is requested. Such a method of controlling the output clutch 26 can be a cause of lowering in the responsiveness upon restarting the vehicle. To address this, the control current for the output clutch pressure control valve 84 may be decreased gradually.

Figure 6A:
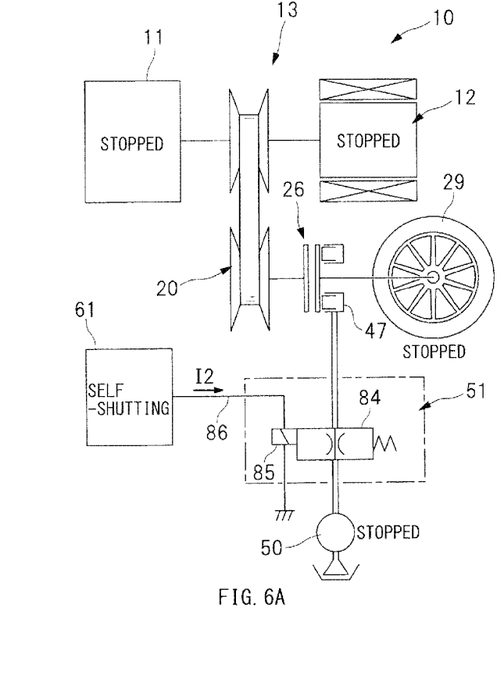
FIG. 6A and FIG. 6B each describe a state of the execution of the fail-safe control.

Then, referring to FIGS. 4 and 6A, a determination is made that the rotation of the engine 11 and that of the motor generator 12 are stopped and the engagement shock of the output clutch 26 is avoided, when the control current for the output clutch pressure control valve 84 is decreased down to a predetermined value I2 at time t3 illustrated in FIG. 4. In this regard, in the electric power generating mode, the time required for the engine 11 and the motor generator 12 to stop rotating from the turning off of the ignition switch 72 is determined in advance by experiment, simulation, etc. Hence, parameters on the decreasing speed of the control current and the predetermined value I2 are so set as to bring the time required for the engine 11 and the motor generator 12 to stop rotating into coincidence with the time required for the control current to be decreased down to the predetermined value I2. In this implementation, the control current is compared with the predetermined value I2 to determine that the engine 11 and the motor generator 12 have stopped rotating. However, this is non-limiting, and alternatively the time elapsed from the turning off of the ignition switch 72 may be measured to determine that the engine 11 and the motor generator 12 have stopped rotating, based on the measured elapsed time, for example.

Figure 6B:
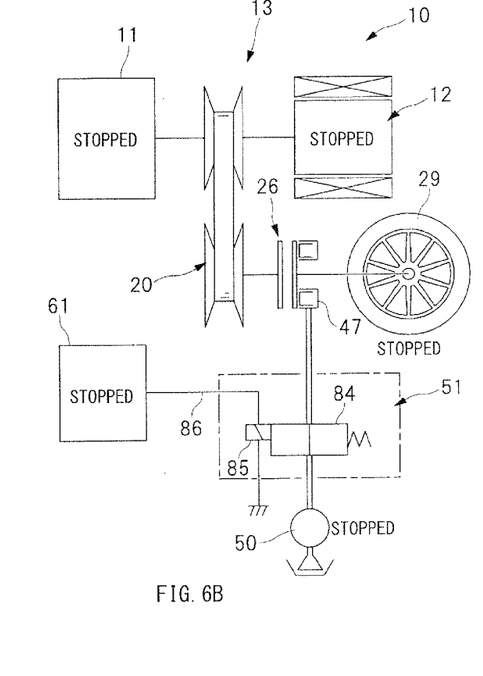

When the determination is made that the control current for the output clutch pressure control valve 84 is decreased down to the predetermined value I2 and the engagement shock of the output clutch 26 is avoided in this way, the transmission control unit 61 executes an ending process such as, but not limited to, storing the learning values, etc., into the backup memory. Then, as illustrated in FIGS. 4 and 6B, the self-shut relay 76 is disconnected to cause the control current for the output clutch pressure control valve 84 to be at 0 A (zero ampere), and the transmission control unit 61 stops operating, at time t4 illustrated in FIG. 4. In the implementation illustrated in FIG. 4, the control current for the output clutch pressure control valve 84 is held at the predetermined value I2 upon execution of the ending process by the transmission control unit 61. However, this is non-limiting, and alternatively the control current for the output clutch pressure control valve 84 may be decreased upon the execution of the ending process by the transmission control unit 61.

Figure 7:
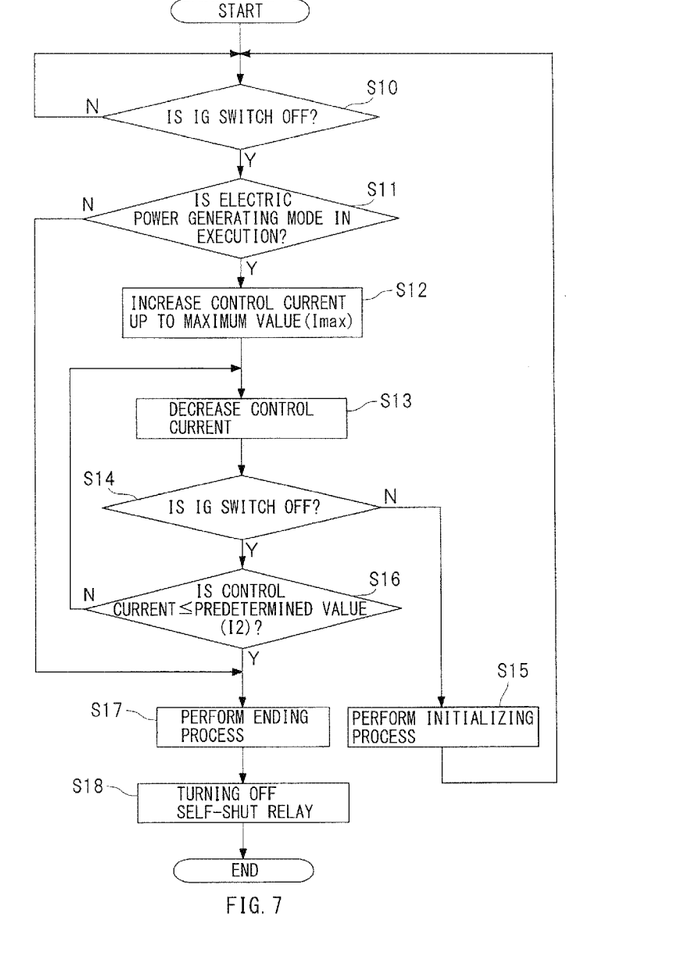
FIG. 7 is a flowchart illustrating an example of a procedure of executing the fail-safe control.

In the following, a description is given, by referring to a flowchart, of an example of a procedure of executing the foregoing fail-safe control. FIG. 7 is a flowchart illustrating one example of the procedure of executing the fail-safe control, in which the ignition switch 72 is denoted as "IG switch".

Referring to FIG. 7, a determination is made as to whether or not the ignition switch 72 is turned off in step S10. When the ignition switch 72 is determined as being turned off in the step S10, the flow proceeds to step S11. In the step S11, a determination is made as to whether or not the operation mode of the vehicle is the electric power generating mode. When the operation mode is determined as being the electric power generating mode in the step S11, the flow proceeds to step S12. In the step S12, the control current for the output clutch pressure control valve 84 is increased up to the maximum value Imax. In subsequent step S13, the control current for the output clutch pressure control valve 84 is decreased.

Then, in step S14, a determination is made as to whether or not the ignition switch 72 remains turned off. When the ignition switch 72 is determined as being turned on in the step S14, the flow proceeds to step S15. In the step S15, an initializing process for restarting the vehicle is executed. When the determination is made in the step S14 that the ignition switch 72 remains turned off, the flow proceeds to step S16. In the step S16, a determination is made as to whether or not the control current for the output clutch pressure control valve 84 is equal to or less than the predetermined value I2. When the control current is determined as being greater than the predetermined value I2 in the step S16, the flow returns to the step S13 to continue decreasing the control current for the output clutch pressure control valve 84. When the control current is determined as being equal to or less than the predetermined value I2, i.e., the engagement shock of the output clutch 26 is avoided, in the step S16, the flow proceeds to step S17. In the step S17, the ending process such as, but not limited to, storing the learning values, etc., into the backup memory is executed.

When the ending process is completed in the step S17, the flow proceeds to step S18 to disconnect the self-shut relay 76.

The control apparatus 10 according to the foregoing implementation increases the control current for the output clutch pressure control valve 84 from the target value I1 to the maximum value Imax, when the ignition switch 72 is turned off during the execution of the electric power generating mode. Hence, it is possible to place the output clutch 26 into the disengaged state even when the ignition switch 72 is turned off, and thereby to suppress or avoid the generation of the engagement shock of the output clutch 26. In the foregoing description, described is one implementation in which the control current for the output clutch pressure control valve 84 is increased to the maximum value Imax when the ignition switch 72 is turned off. However, this is non-limiting, and alternatively the control current may be increased to a current value lower than the maximum value Imax when the ignition switch 72 is turned off. Also, described is one implementation in which the control current for the output clutch pressure control valve 84 is controlled at the target value I1 in the electric power generating mode. However, this is non-limiting, and alternatively the control current for the output clutch pressure control valve 84 may be controlled at the minimum value (0 A), for example.

In the foregoing description, described is one implementation in which the control current for the output clutch pressure control valve 84 is increased when the ignition switch 72 is turned off. However, this is non-limiting, and it is possible to disengage the output clutch 26 and to suppress or avoid the generation of the engagement shock by increasing the control current for the output clutch pressure control valve 84, even when, for example, the ignition electric power supply line 70 is placed into the non-conducting state due to breaking of a wire or any other factor that brings the ignition electric power supply line 70 into the non-conducting state. Also, in the foregoing description, described is one implementation in which the hydraulically-controlled output clutch 26 is used for the clutch mechanism. However, this is non-limiting, and alternatively an electromagnetic clutch may be used for the clutch mechanism in which a state is switched over between the engaged state and the disengaged state by means of electromagnetic force, for example.

Although some preferred implementations of the technology have been described in the foregoing by way of example, the technology is by no means limited to the implementations described above. For example, the power unit 13 in the illustrated implementation has a configuration in which the continuously-variable transmission 20 is provided between the engine 11 and the motor generator 12. However, the power unit 13 is not limited to this configuration, and any implementation of the technology is applicable effectively to a power unit in which a motor generator is disposed between an engine and a transmission, for example. Also, in the illustrated implementation, the power unit 13 is mounted with the continuously-variable transmission 20. However, this is non-limiting, and alternatively the power unit may be mounted with, for example but not limited to, a parallel shaft transmission or a planetary gear transmission.

Although some preferred implementations of the technology have been described in the foregoing by way of example with reference to the accompanying drawings, the technology is by no means limited to the implementations described above. It should be appreciated that modifications and alterations may be made by persons skilled in the art without departing from the scope as defined by the appended claims.

The technology is intended to include such modifications and alterations in so far as they fall within the scope of the appended claims or the equivalents thereof.

The invention claimed is:

1. A control apparatus for a vehicle, the control apparatus comprising:
    a first power transmission path that connects an engine and an electric motor together;
    a second power transmission path that connects the first power transmission path and drive wheels together;
    a clutch mechanism inserted in the second power transmission path, and switched over between an engaged state and a disengaged state;
    a clutch controller that controls the clutch mechanism to be in the engaged state in response to a decrease in a supply current, and controls the clutch mechanism to be in the disengaged state in response to an increase in the supply current;
    a supply current controller coupled to the clutch controller through a conduction line and to an electric power supply through a first electric power supply line and a second electric power supply line in a parallel fashion, and that controls the supply current supplied to the clutch controller;
    a self-shut relay that holds a conducting state of the second electric power supply line over a set time, in response to a change in a state of the first electric power supply line from a conducting state to a non-conducting state; and
    a hybrid control unit that operates with the supply current controller to execute an electric power generating mode upon a stop of the vehicle, the electric power generating mode driving the electric motor to generate electric power upon the stop of the vehicle, and the stop of the vehicle causing the clutch mechanism to be disengaged, wherein
    when the electric power generating mode is executed, the supply current controller sets the supply current supplied to the clutch controller to a first current value set in the range from a minimum value to a maximum value, and
    when the state of the first electric power supply line is changed from the conducting state to the non-conducting state in the state the electric power generating mode is executed, the supply current controller increases the supply current supplied to the clutch controller to a second current value larger than the first current value.

2. The control apparatus for a vehicle according to claim 1, wherein, when the state of the first electric power supply line is changed from the conducting state to the non-conducting state, the supply current controller increases the supply current from the first current value to the second current value at a first speed, and decreases the supply current from the second current value at a second speed after the supply current is increased at the first speed, the second speed being slower than the first speed.

3. The control apparatus for a vehicle according to claim 2, wherein the clutch controller comprises a solenoid valve that adjusts pressure of an operating oil and feeds the clutch mechanism with the pressure-adjusted operating oil, the operating oil being fed from an oil pump driven by the engine.

4. The control apparatus for a vehicle according to claim 3, the control apparatus further comprising an ignition switch inserted in the first electric power supply line.

5. The control apparatus for a vehicle according to claim 4, wherein the electric power generating mode controller executes the electric power generating mode, on a condition that a select lever is at a drive range.

6. The control apparatus for a vehicle according to claim 3, wherein the electric power generating mode controller executes the electric power generating mode, on a condition that a select lever is at a drive range.

7. The control apparatus for a vehicle according to claim 2, the control apparatus further comprising an ignition switch inserted in the first electric power supply line.

8. The control apparatus for a vehicle according to claim 7, wherein the electric power generating mode controller executes the electric power generating mode, on a condition that a select lever is at a drive range.

9. The control apparatus for a vehicle according to claim 2, wherein the electric power generating mode controller executes the electric power generating mode, on a condition that a select lever is at a drive range.

10. The control apparatus for a vehicle according to claim 1, wherein the clutch controller comprises a solenoid valve that adjusts pressure of an operating oil and feeds the clutch mechanism with the pressure-adjusted operating oil, the operating oil being fed from an oil pump driven by the engine.

11. The control apparatus for a vehicle according to claim 10, the control apparatus further comprising an ignition switch inserted in the first electric power supply line.

12. The control apparatus for a vehicle according to claim 11, wherein the electric power generating mode controller executes the electric power generating mode, on a condition that a select lever is at a drive range.

13. The control apparatus for a vehicle according to claim 10, wherein the electric power generating mode controller executes the electric power generating mode, on a condition that a select lever is at a drive range.

14. The control apparatus for a vehicle according to claim 1, the control apparatus further comprising an ignition switch inserted in the first electric power supply line.

15. The control apparatus for a vehicle according to claim 14, wherein the electric power generating mode controller executes the electric power generating mode, on a condition that a select lever is at a drive range.

16. The control apparatus for a vehicle according to claim 1, wherein the electric power generating mode controller executes the electric power generating mode, on a condition that a select lever is at a drive range.

* * * * *